United States Patent
Yang et al.

(10) Patent No.: US 8,107,819 B2
(45) Date of Patent: Jan. 31, 2012

(54) SYSTEMS AND METHODS FOR INTERFERENCE PREDICTION

(75) Inventors: Chun-Liang Yang, Sansia Township (TW); Dar-Zu Hsu, Xigang Village (TW)

(73) Assignee: Industrial Technology Research Institute, Hsinchu (TW)

( * ) Notice: Subject to any disclaimer, the term of this patent is extended or adjusted under 35 U.S.C. 154(b) by 565 days.

(21) Appl. No.: 11/756,514

(22) Filed: May 31, 2007

(65) Prior Publication Data

US 2008/0298807 A1 Dec. 4, 2008

(51) Int. Cl.
*H01S 3/00* (2006.01)
*H01S 4/00* (2006.01)
*H04B 10/00* (2006.01)
*H04B 10/08* (2006.01)
*G02B 6/00* (2006.01)
*G02B 26/02* (2006.01)

(52) U.S. Cl. ............... 398/98; 398/94; 398/43; 398/79; 398/135; 398/33; 398/162; 359/341.41; 359/337.13; 359/337.1; 385/11; 385/140

(58) Field of Classification Search ................. 398/98, 398/43, 94
See application file for complete search history.

(56) References Cited

U.S. PATENT DOCUMENTS

| | | | |
|---|---|---|---|
| 6,018,411 A * | 1/2000 | Fukushima et al. | 359/283 |
| 6,466,704 B1 * | 10/2002 | Frisken | 385/11 |
| 6,903,864 B1 * | 6/2005 | Sieben | 359/337.13 |
| 7,170,921 B1 * | 1/2007 | Freeman et al. | 372/106 |
| 7,209,284 B2 * | 4/2007 | Shukunami et al. | 359/341.41 |
| 7,409,164 B2 * | 8/2008 | Seo | 398/162 |
| 2003/0142391 A1 * | 7/2003 | Kosaka | 359/337.1 |
| 2004/0067066 A1 * | 4/2004 | Uesaka | 398/194 |
| 2004/0247246 A1 | 12/2004 | Lee et al. | |
| 2005/0207637 A1 * | 9/2005 | Nakano et al. | 382/145 |
| 2005/0244160 A1 * | 11/2005 | Seo | 398/72 |
| 2006/0133813 A1 * | 6/2006 | Ekkizogloy et al. | 398/135 |
| 2006/0268405 A1 * | 11/2006 | Takeuchi et al. | 359/483 |
| 2007/0065089 A1 * | 3/2007 | Matsuoka et al. | 385/140 |
| 2007/0230959 A1 * | 10/2007 | Kamioka et al. | 398/79 |
| 2008/0292312 A1 * | 11/2008 | Oron et al. | 398/33 |

FOREIGN PATENT DOCUMENTS

| | | |
|---|---|---|
| JP | 10-161076 | 6/1998 |
| JP | 2001 526407 | 12/2001 |
| JP | 2005-318629 | 11/2005 |
| WO | 10145337 | 5/1998 |

OTHER PUBLICATIONS

Garner et al., "Variable Optical Attenuator for Large-Scale Integration," *IEEE Photonics Technology Letters*, vol. 14, No. 11, pp. 1560-1562, Nov. 2002.

Hurvitz et al., "Variable Optical Attenuator Based on Ion-Exchange Technology in Glass," *IEEE Journal of Lightwave Technology*, vol. 23, No. 5, pp. 1918-1922, May 2005.

Japan Office Action for Appl. No. 2007-300918 dated Nov. 24, 2010.

* cited by examiner

*Primary Examiner* — Shi K Li
*Assistant Examiner* — Oommen Jacob
(74) *Attorney, Agent, or Firm* — Alston & Bird LLP

(57) ABSTRACT

An optical network device of a passive optical network is introduced. The optical network device includes a light source, a control unit, and a variable optical attenuator. The light source can generate an optical signal. The control unit can generate a magnetic signal based on a control signal capable of providing information relating to a distance between the optical network device and an optical line termination. The variable optical attenuator can adjust a polarization angle of the optical signal based on the magnetic signal.

14 Claims, 10 Drawing Sheets

SYSTEMS AND METHODS FOR INTERFERENCE PREDICTION

BACKGROUND OF THE INVENTION

The present invention generally relates to an optical network device, and more particularly, to an optical network device or unit of a passive optical network capable of magnetically adjusting the power of an upstream optical signal to be outputted to an optical line termination of the passive optical network.

Optical devices or units are devices that process optical signals in connection with an optical network. An example of employing optical units is for facilitating the communication between a user terminal and an optical network. FIG. 1 is a schematic diagram illustrating a prior art passive optical network (PON). Referring to FIG. 1, a passive optical network 10 includes an optical line termination OLT, an optical distribution network ODN, and a plurality of optical network units ONU1-ONUn. The optical line termination OLT, which can be at a central office (CO) connected to external networks, can provide various network services, such as Internet, digital television, high definition television (HDTV) or Voice over Internet Protocol (VOIP). The optical distribution network ODN may include optical fibers and an optical splitter. The optical splitter of the optical distribution network ODN can distribute downstream data from the optical line termination OLT to one or more of the optical network units, or collect upstream data to be transmitted from one or more of the optical network units to the optical line termination OLT. The optical network units ONU1-ONUn are normally placed at customer ends, also known as customer remises equipments (CPEs). Depending on the locations of the optical network units ONU1-ONUn, the passive optical network 10 can be categorized into fiber to the home (FTTH), fiber to the building (FTTB), fiber to the curb (FTTC), or fiber to the premises (FTTP) networks.

For communication from the optical line termination OLT to one or several of the optical network units ONU1-ONUn, data are simultaneously transmitted downstream through a fiber. For communication from one or several of the optical network units ONU1-ONUn to the optical line termination OLT, data are transmitted upstream using the same wavelength and obtained from the same fiber by the optical splitter of the optical distribution network ODN. Therefore, a time division multiplexing (TDM) scheme is employed so that each of the optical network units ONU1-ONUn can upload data to the optical line termination OLT during its corresponding time slot. Since the distances between the optical line termination OLT and the optical network units ONU1-ONUn may vary, the upstream and downstream signals may encounter different degrees of optical signal power loss. Although the downstream signals from the optical line termination OLT to the optical network units ONU1-ONUn may have different power levels upon arrival, an optical receiver provided in each of the optical network units ONU1-ONUn generally is able to process individual downstream signals. However, it may be difficult for an optical receiver of the optical line termination OLT to process incoming upstream signals from the optical network units ONU1-ONUn having different power levels. To obtain accurate data from the corresponding optical network unit, the optical line termination OLT sometimes needs to be able to determine the peak power of each upstream signal.

U.S. Patent Publication No. 20040247246, entitled "OPTICAL POWER EQUALIZER IN A PASSIVE OPTICAL NETWORK", discloses an optical power equalizer capable of equalizing the power levels of the upstream signals outputted by a plurality of optical network units. The optical power equalizer may include an amplifier circuit able to provide gain adjustment in real time. However, the use of amplifiers circuit may raise cost concerns in some applications.

In U.S. Patent Publication No. 20050244160, entitled "OPTICAL TRANSCEIVER FOR COMPENSATING FOR LOSS DUE TO TRANSMISSION DISTANCE IN PASSIVE OPTICAL NETWORK", the distances between an optical line termination and a plurality of optical network units are respectively calculated based on the peak values of downstream signals received by the corresponding optical network units. Each optical network unit can then adjust the output power of an upstream signal by adjusting the bias current of a laser module.

In IEEE Photonics Technology Letters, Vol. 14, No. 11, pp. 1560-1562, Nov. 2002, in a paper entitled "*VARIABLE OPTICAL ATTENUATOR FOR LARGE-SCALE INTEGRATION*" by Garner et al., a variable optical attenuator with a waveguide bend design is disclosed. The reflectivity of the waveguide can be varied by changing the temperature using an electrode heater, thereby varying the amount of signal attenuation.

In IEEE Journal of Lightwave Technology, Vol. 23, No. 5, pp. 1918-1922, May 2005, in a paper entitled "*VARIABLE OPTICAL ATTENUATOR BASED ON ION-EXCHANGE TECHNOLOGY IN GLASS*" by Ruschin et al, a variable optical attenuator based on the Mach-Zehnder (MZR) interferometer principle is disclosed. The variable optical attenuator includes two MZR optical paths having distinct lengths. The reflectivity of the MZR optical paths can be varied by changing the temperature using an electrode heater, thereby varying the signal interferences between the two MZR optical paths and the overall signal attenuation.

Depending on the applications and the devices or circuits used, certain applications in the past to adjust the power level of optical signals may raise cost concerns in some applications. In some applications or system designs, it may be desirable to have an optical network unit that is able to provide power level control without significant cost.

BRIEF SUMMARY OF THE INVENTION

Examples of the present invention may provide an optical network device in a passive optical network comprising a control unit capable of generating a magnetic signal based on a control signal capable of providing information relating to a distance between the optical network device and the optical line termination, and a variable optical attenuator capable of adjusting a polarization angle of an input optical signal based on the magnetic signal.

Examples of the present invention may also provide a passive optical network comprising an optical line termination capable of generating a plurality of downstream optical signals and a plurality of optical network units each being capable of generating an upstream optical signal having a magnitude magnetically adjusted based on a distances between the each optical network unit and the optical line termination. Each of the plurality of optical network units further includes a control unit capable of generating a magnetic signal based on a control signal capable of providing information regarding a distance between the optical network unit and the optical line termination, and a variable optical attenuator capable of adjusting a polarization angle of an optical signal based on the magnetic signal.

Examples of the present invention may also provide an optical network device in a passive optical network comprising a receiver capable of receiving an optical signal from an optical line termination in the passive optical network, the optical signal including information regarding the distance between the optical network unit and the optical line termination, a VOA control unit capable of generating a magnetic signal based on the information, and a polarization rotator being rotatable, the polarization rotator being rotated based on the magnetic signal to provide a polarization angle for an incident light.

Examples of the present invention may also provide a passive optical network, comprising an optical line termination, a first optical network unit and a second optical network unit. The first optical network unit is located at a first distance from the optical line termination and comprises a first receiver capable of receiving a first optical signal including information regarding the first distance and a first rotator being rotated based on the first optical signal to provide a first polarization angle for a first upstream signal. The second optical network unit is located at a second distance from the optical line termination and comprises a second receiver capable of receiving a second optical signal including information regarding the second distance and a second rotator being rotated based on the second optical signal to provide a second polarization angle for a second upstream signal, wherein the first upstream signal has substantially the same power level as the second upstream signal when the first and second upstream signals arrive at the optical line termination.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings.

DETAILED DESCRIPTION OF THE INVENTION

Reference will now be made in detail to the present examples of the invention illustrated in the accompanying drawings. Wherever possible, the same reference numbers will be used throughout the drawings to refer to the same or like portions.

Figure 1:
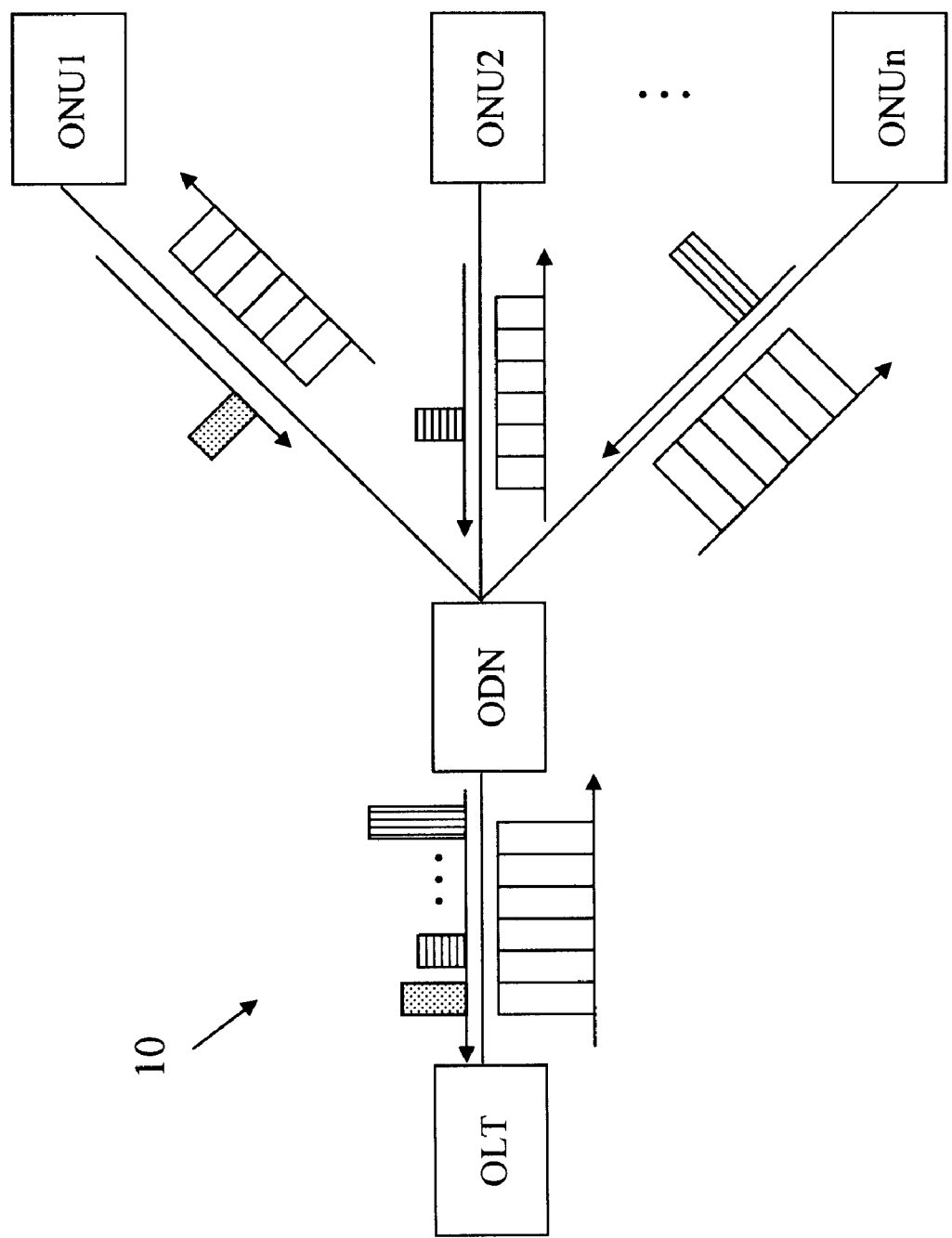
FIG. 1 is a schematic diagram of a prior art passive optical network.
Figure 2A:
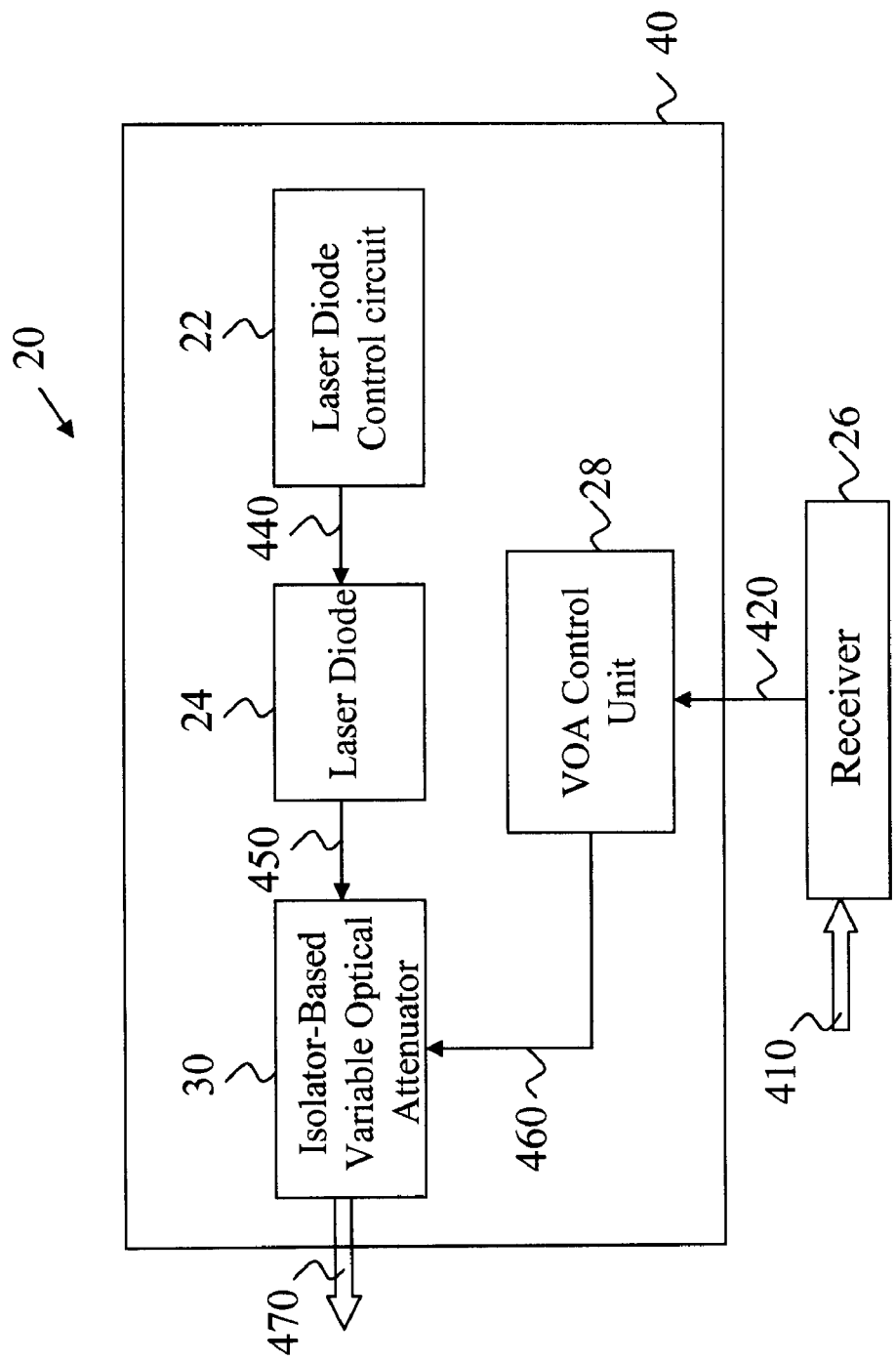
FIG. 2A is a block diagram illustrating an optical network unit of a passive optical network according to one example of the present invention.

FIG. 2A is a block diagram illustrating an optical network unit of a passive optical network according to one example of the present invention. Referring to FIG. 2A, an optical network unit 20 including a receiver 26 and a laser module 40 is provided. The receiver 26 may receive a downstream optical signal 410 from an optical line termination (not shown) of the passive optical network. The downstream optical signal 410 may include data signals and control signals. The control signals may contain information related to the distance between the optical network unit 20 and the optical line termination. Based on the control signals in the downstream optical signal 410, the receiver 26 may generate a corresponding control signal 420 for operating the laser module 40 in one example. The receiver 26 and the laser module 40 may be included in a transceiver of the optical network unit 20 in one example. The laser module 40 may include a laser control circuit 22, a laser diode 24, a variable optical attenuator (VOA) control unit 28, and an isolator-based VOA 30. The laser control circuit 22 may generate a driving signal 440 to drive the laser diode 24. The laser diode 24, which functions to serve as a light source, may generate a linear-polarized optical signal 450, which is then sent to the isolator-based VOA 30. The VOA control unit 28 may generate a magnetic signal 460 for controlling the isolator-based VOA 30 based on the control signal 420 from the receiver 26. The magnetic signal 460 provides a magnetic field in the propagation direction of the optical signal 450. The magnetic field may have a magnetic flux density related to the distance between the optical network unit 20 and the optical line termination. The isolator-based VOA 30 generates an output upstream optical signal 470 by adjusting the magnitude of the optical signal 450 from the laser diode 24 based on the magnetic signal 460 applied by the VOA control unit 28. In other words, the optical network unit 20 adjusts the output power of the upstream optical signal 430 based on the distance between the optical network unit 20 and the optical line termination. In one example according to the present invention, the VOA control unit 28 may include an electromagnet. In other examples, the VOA control unit 28 may include at least one permanent magnet. Furthermore, the isolator-based VOA 30 may include one of a polarization-dependent attenuator and a polarization-independent attenuator.

Figure 2B:
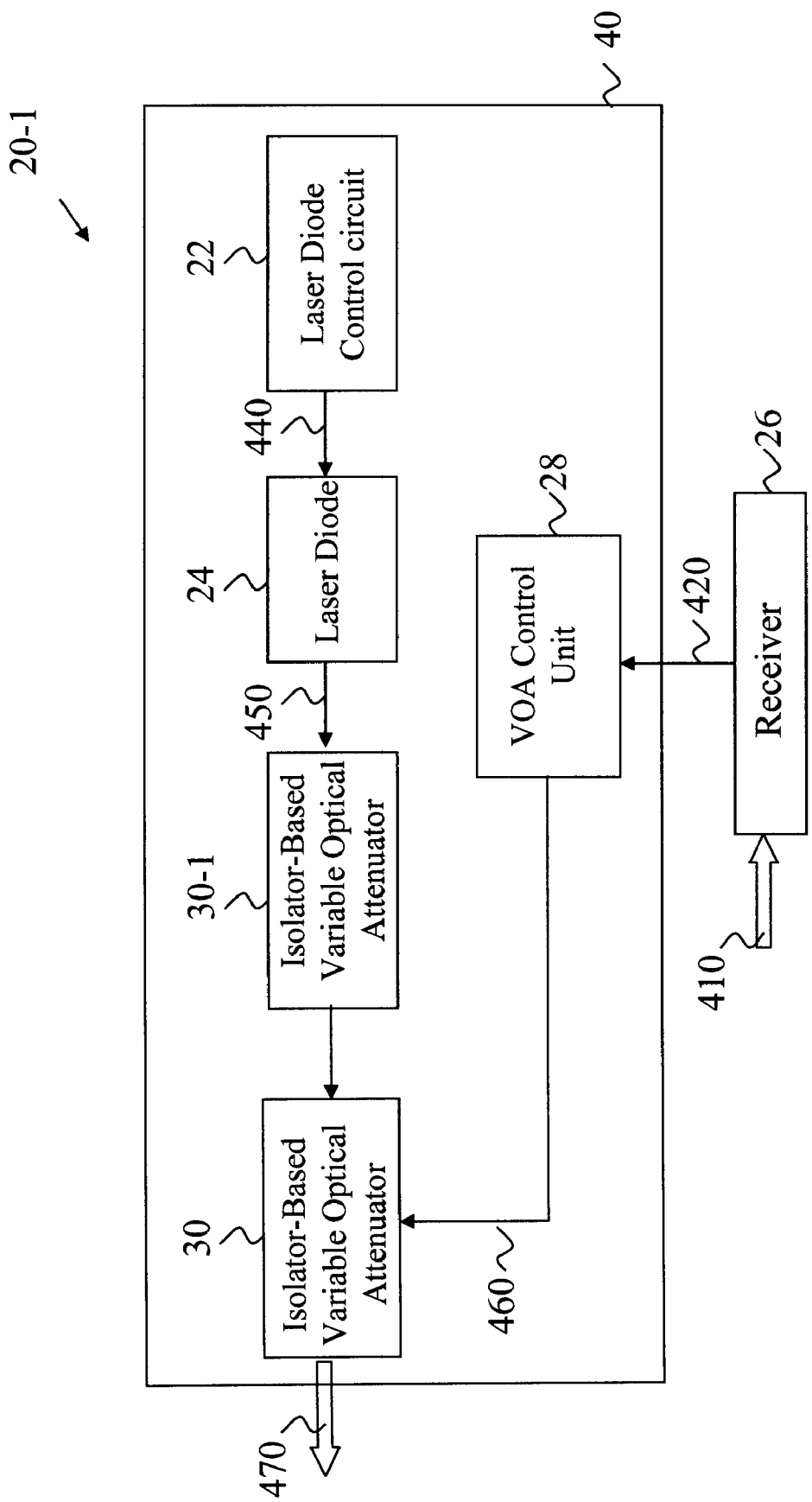
FIG. 2B is a schematic block diagram of an optical network unit of a passive optical network according to another example of the present invention.

FIG. 2B is a schematic block diagram of an optical network unit 20-1 of a passive optical network according to another example of the present invention. Referring to FIG. 2B, the optical network unit 20-1 may be similar to the optical network unit 20 illustrated in FIG. 2A except that the optical network unit 20-1 further includes another isolator-based VOA 30-1. The isolator-based VOA 30-1 may include an optical isolator capable of reducing or inhibiting reflected light from the isolator-based VOA 30. In one example consistent with the present invention, the isolator-based VOA 30-1 may include a Faraday rotator.

Figure 3A:
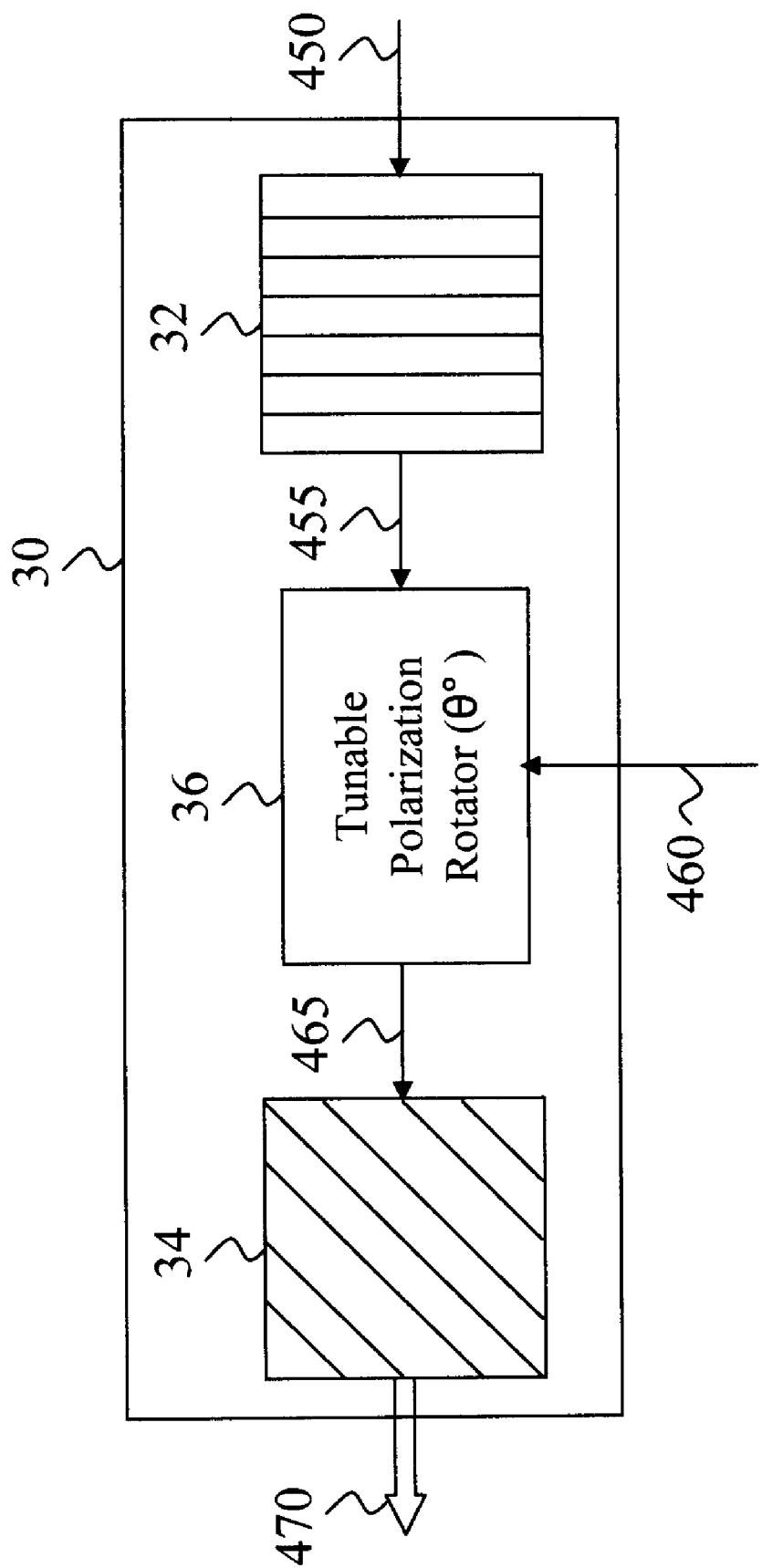
FIG. 3A is a block diagram illustrating an isolator-based variable optical attenuator (VOA) in an optical network unit according to one example of the present invention.

FIG. 3A is a block diagram illustrating the isolator-based VOA 30 illustrated in FIG. 2A. Referring to FIG. 3A, the isolator-based VOA 30 may include an input polarizer 32, an output polarizer 34, and a tunable polarization rotator 36 in one example. The input polarizer 32 and the output polarizer 34 may include devices such as linear polarizers or polarizing beam splitters (PBS). A polarizer allows an incident light to pass with a certain polarization angle. The tunable polarization rotator 36 may include a Faraday rotator based on a magneto-optic effect in which the polarization plane of an incident optical signal is rotated in a magnetic field parallel to the direction of propagation. The magneto-optic effect is a result of ferromagnetic resonance when the permeability of light is represented by a tensor. This resonance causes the incident optical signal to be decomposed into two circularly polarized rays which propagate at different phase speeds, a property known as circular birefringence. Upon emergence from the Faraday rotator, the rays can be considered to recombine with a net phase offset owing to the difference in propagation speed, thereby resulting in a rotation of the polarization plane. The angle of rotation θ (in radians) can be represented by BVI, where B is the magnetic flux density in the direction of propagation (in teslas), V is the Verdet constant for the material of the Faraday rotator, and I is the effective length of the path (in meters) where the incident optical signal and the magnetic field interact.

In one example, the input polarizer 32 may be configured according to the polarization plane of the optical signal 450 generated by the laser diode 24 illustrated in FIG. 2. As a result, the input polarizer 32 transmits the optical signal 450 and blocks other signals having different polarization planes. Assuming the polarization plane of the optical signal 450 is parallel to the θ°-polarization plane in the vertical direction and the input polarizer 32 is thus configured, the optical signal 455 from the input polarizer 32 has a 0°-polarization plane. The tunable polarization rotator 36 then rotates the optical signal 455 by θ°, thereby resulting in an optical signal 465 having a θ°-polarization plane. The value of the rotation angle θ depends on the magnetic signal 460 from the VOA control unit 28 illustrated in FIG. 2. In one example, the VOA control unit 28 may provide an electromagnetic force based on the distance information. The electromagnetic force, which may be provided through an electromagnet or at least one permanent magnet mounted external to the tunable polarization rotator 36, may increase as the distance decreases, or vice versa, in order to provide various polarization angles, which would vary the amount of attenuation. The output polarizer 34 is aligned with a 45° difference in polarization angle with respect to the input polarizer 32. Consequently, only a tensor of the θ°-polarized optical signal 465 which has a 45°-polarization plane is allowed to pass, thereby resulting in a 45°-polarized optical signal 470.

Figure 3B:
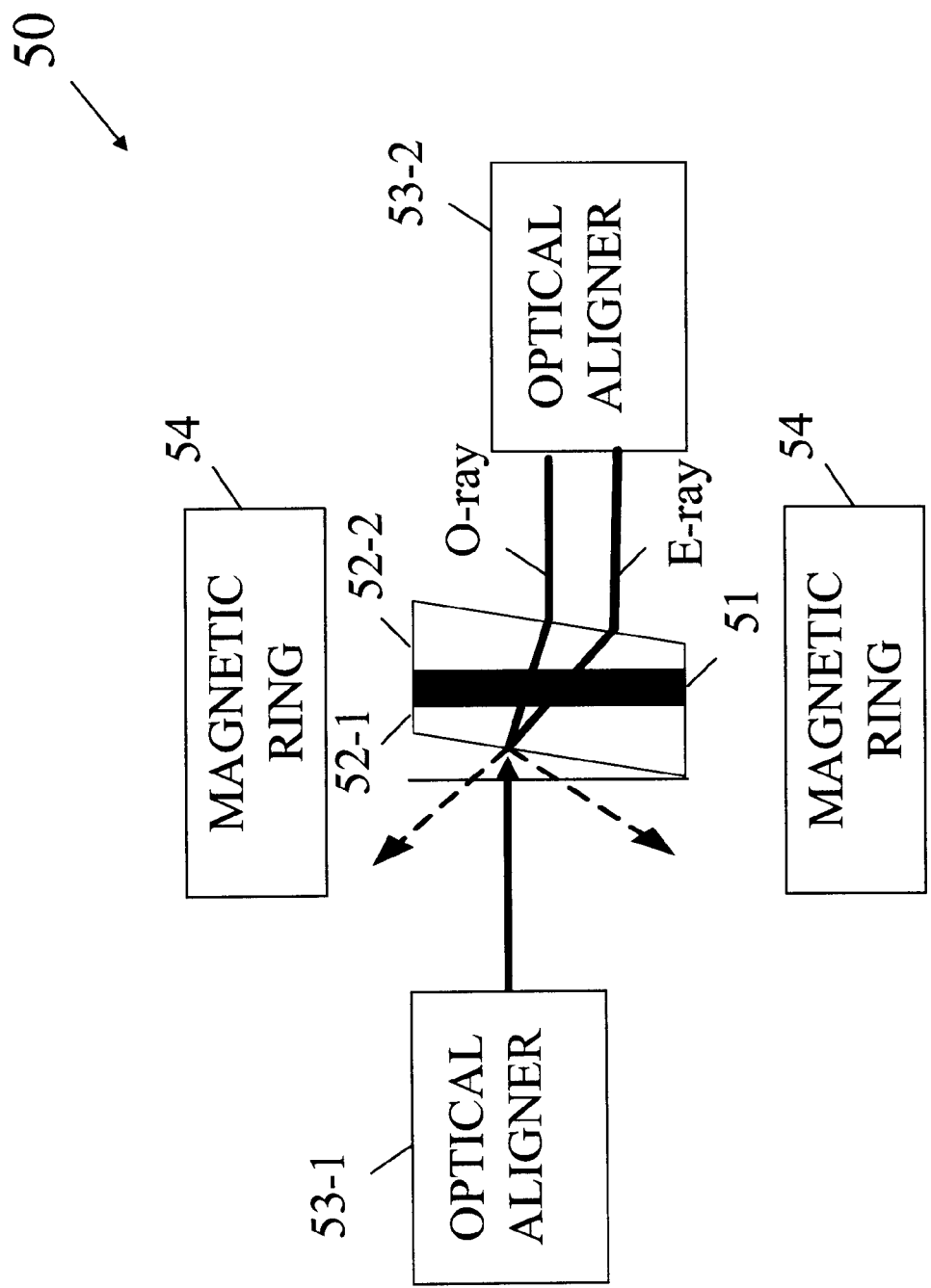
FIG. 3B is a schematic diagram illustrating an isolation-based VOA according to another example of the present invention.

The isolation-based VOA 30 illustrated in FIG. 3A may include a polarization-dependent attenuator. In other examples, an isolation-based VOA used in the present invention may include a polarization-independent attenuator. FIG. 3B is a schematic diagram illustrating an isolation-based VOA 50 according to another example of the present invention. Referring to FIG. 3B, the isolation-based VOA 50, which is a polarization-independent type, may include a rotator 51 such as a Faraday rotator, a pair of birefrigent crystals 52-1 and 52-2, which sandwich the rotator 51, a pair of optical aligners 53-1 and 53-2 and a magnetic ring 54 capable of providing a magnetic field. An incident light or a forward light from one optical aligner 53-1 may be split into two components, i.e., an ordinary-ray (O-ray) component and an extraordinary-ray (E-ray) component. The O-ray and E-ray components, due to the function of the birefrigent crystals 52-1 and 52-2, may travel in parallel with one another and then be received at the other optical aligner 53-2. However, a backward light from the optical aligner 53-2 may be split in optical paths (illustrated in arrow-head dotted lines) away from one another and thus may not be received at the optical aligner 53-1.

Figure 4A:
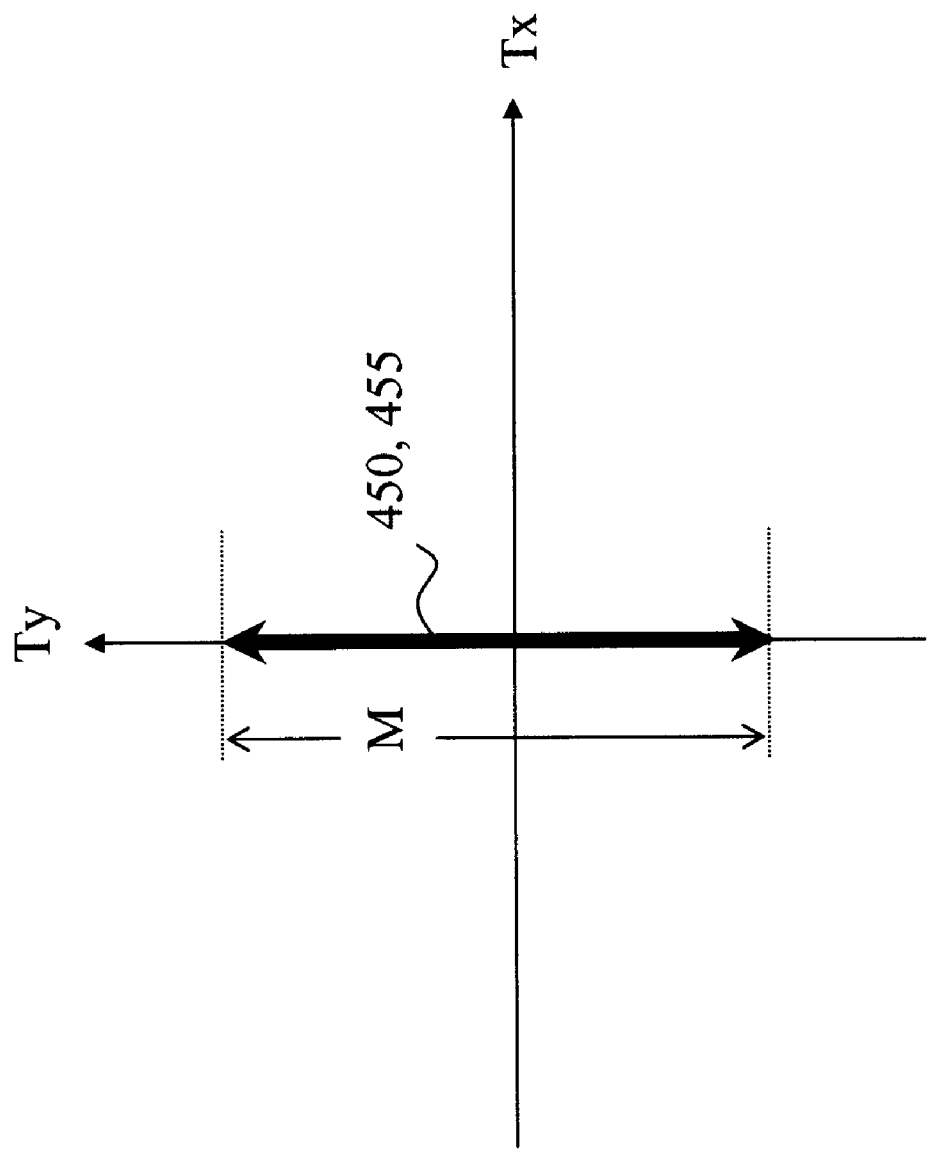
FIGS. 4a, 4b and 4c are schematic diagrams illustrating the polarization planes and the magnitudes of the optical signals according to examples of the present invention.
Figure 4B:
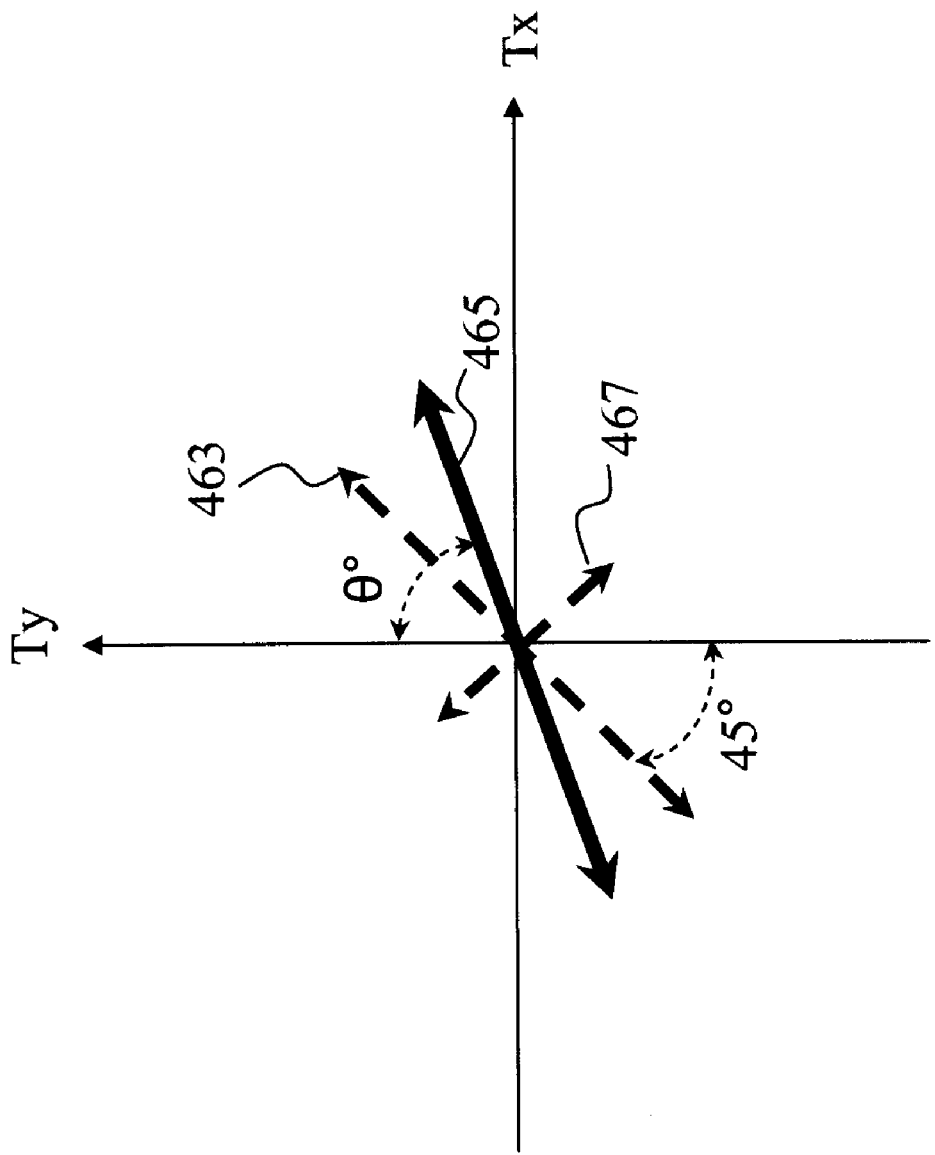
Figure 4C:
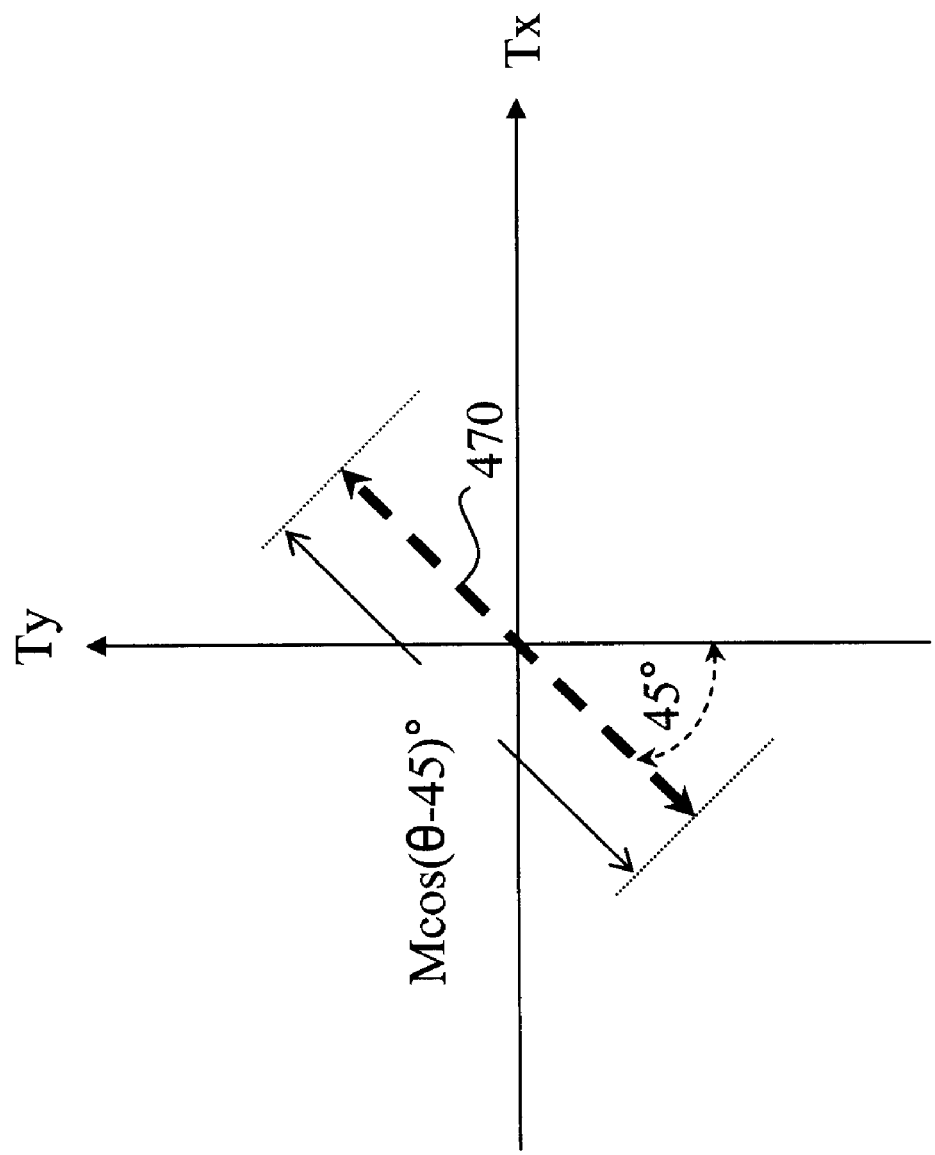

FIGS. 4a, 4b and 4c are schematic diagrams illustrating the polarization planes and the magnitudes of the optical signals 450, 455, 465, and 470. In FIGS. 4a, 4b and 4c, Tx represents a tensor parallel to the direction of signal propagation (the horizontal direction), and Ty represents a tensor perpendicular to the direction of signal propagation (the vertical direction). For ease of an exemplary explanation, assuming the vertical direction is parallel to the 0°-polarization plane, the horizontal direction is parallel to the 90°-polarization plane, and the value of the rotation angle θ increases in the clockwise direction. In other words, an optical signal having a 0°-polarization plane is parallel to the tensor Ty, and an optical signal having a 90°-polarization plane is parallel to the tensor Tx.

Referring to FIG. 4a, the polarization planes and the magnitudes of the optical signals 450 and 455 are illustrated. Since the laser diode 24 in FIG. 2 can generate linearly-polarized optical signal 450 having a magnitude M and the input polarizer 32 having a 0°-polarization plane may be configured accordingly, the incoming optical signal 450 and the outgoing optical signal 455 regarding to the input polarizer 32 are both 0°-polarized and have the magnitude M, as illustrated by the bold arrow in FIG. 4a.

Referring to FIG. 4b, the polarization plane and the magnitude of the optical signal 465 is illustrated. After the tunable polarization rotator 36 rotates the optical signal 455 by θ° in the clockwise direction (assuming θ is equal to or larger than 45), the resultant θ°-polarized optical signal 465 can be decomposed into a 45°-polarized optical signal 463 having a magnitude equal to Mcos(θ-45)° and a 135°-polarized optical signal 467 having a magnitude equal to Msin(θ-45)'. The optical signal 465 is represented by the bold arrow in FIG. 4b, and the optical signals 463 and 467 are represented by the dash arrows in FIG. 4b.

Referring to FIG. 4c, the polarization plane and the magnitude of the optical signal 470 is illustrated. Since the output polarizer 34 is aligned with a 45° difference in polarization angle with respect to the input polarizer 32, the output polarizer 34 only transmits optical signals having a 45°-polarization plane. As a result, the 45°-polarized optical signal 463 having a magnitude equal to Mcos(θ-45)° continues to propagate and the 135°-polarized optical signal 467 is blocked. Therefore, the resultant 45°-polarized optical signal 470 has a magnitude equal to Mcos(θ-45)°, as represented by the dash arrows in FIG. 4c.

Figure 5:
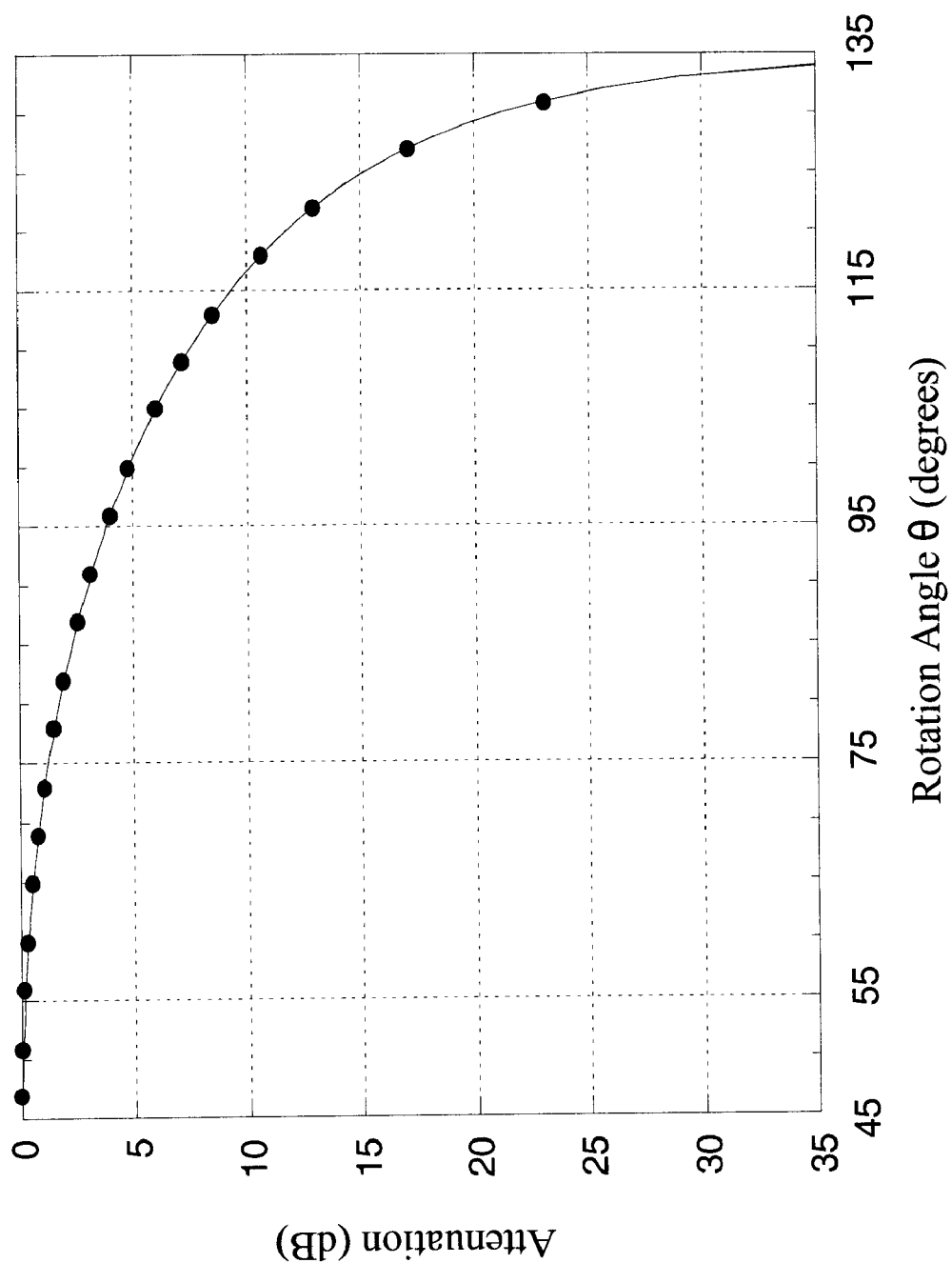
FIG. 5 is a diagram illustrating simulation results of signal attenuation of optical signals as a function of rotation angle.

FIG. 5 is a diagram illustrating simulation results of signal attenuation of optical signals as a function of rotation angle. Referring to FIG. 5, the transverse axis represents the rotation angle θ (in degrees) of the optical signal 465 before entering the output polarizer 34, and the vertical axis represents the signal attenuation (in decibels, dB) of the output signal of the variable optical attenuator 30 (the optical signal 470) relative to the input signal of the variable optical attenuator 30 (the optical signal 450). The signal attenuation of the optical signal 470 outputted by the optical network unit 20 ranges from approximately 0 dB (zero attenuation) to 35 dB as the value of θ varies approximately from 45° to 135°. Consequently, the polarization plane and the magnitude of the optical signal 470 outputted by the optical network unit 20 may be adjusted by changing the amount of the magnetic signal 460 applied to the variable optical attenuator 30 from the VOA control unit 28.

The optical network unit 20 may thus magnetically adjust the output power of the upstream optical signal 450 based on the distance between the optical network unit 20 and the optical line termination.

Figure 6:
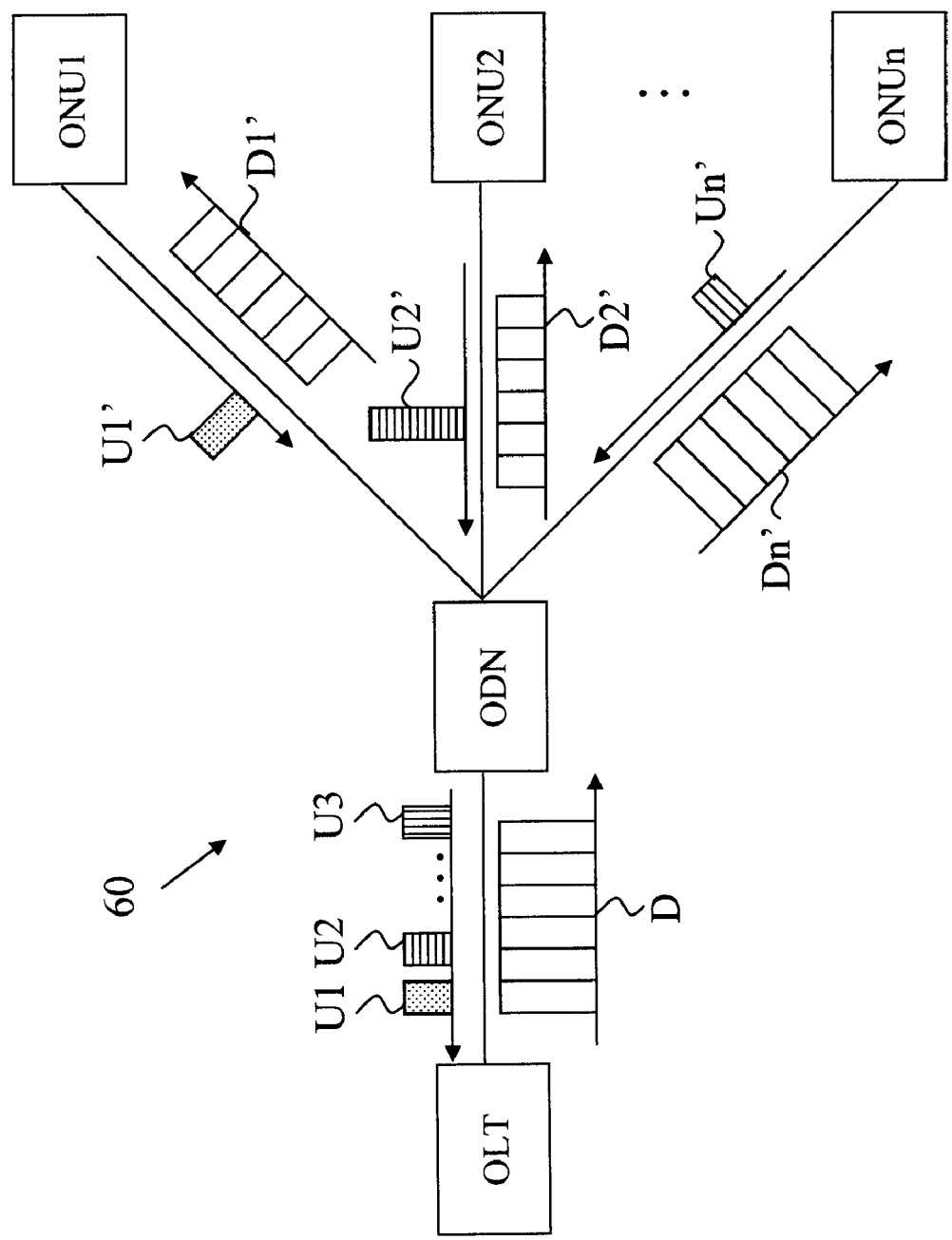
FIG. 6 is a schematic diagram illustrating a passive optical network according to one example of the present invention.

FIG. 6 is a schematic diagram illustrating a passive optical network 60 according to one example of the present invention. Referring to FIG. 6, a passive optical network 60 includes an optical line termination OLT, an optical distribution network ODN, and a plurality of optical network units ONU1-ONUn (only the optical network units ONU1, ONU2 and ONUn are depicted in FIG. 6 for the purpose of simplicity). Each of the optical network units ONU1-ONUn is similar to the optical network unit 20 illustrated in FIG. 2. Downstream optical signals D from the optical line termination OLT is distributed to each optical network unit via the optical distribution network ODN, and upstream optical signals U1'-Un' respectively outputted by the optical network units ONU1-ONUn are collected by the optical distribution network ODN before transmitted to the optical line termination OLT. Because the distances between the optical line termination OLT and the optical network units ONU1-ONUn may be different, the downstream optical signals D1'-Dn' respectively arriving at the optical network units ONU1-ONUn may have different power levels from those of the downstream optical signals D due to different degrees of optical signal power loss.

Based on the downstream optical signals D1'-Dn', the optical network units ONU1-ONUn receive data signals as well as control signals containing information regarding the distances between the optical line termination OLT and the optical network units ONU1-ONUn. The optical network units ONU1-ONUn may magnetically adjust the power levels of the corresponding upstream optical signals U1'-Un' based on the distances between the optical line termination OLT and the optical network units ONU1-ONUn, respectively. For example, among the optical network units ONU1, ONU2 and ONUn shown in FIG. 6, the optical network unit ONUn is closest to the optical line termination OLT, while the optical network unit ONU2 is farthermost from the optical line termination OLT. As a result, optical signals transmitted between the optical line termination OLT and the optical network unit ONU2 encounter a greater power loss than those transmitted between the optical line termination OLT and the optical network unit ONUn. Under these circumstances, the optical network unit ONU2 outputs the upstream optical signals U2' with a relatively high power level and the optical network unit ONUn outputs the upstream optical signals Un' with a relatively low power level, thereby compensating the different degrees of optical signal power loss. Consequently, when the upstream optical signals U1', U2' and Un' arrive at the ODN, the resultant upstream optical signals U1, U2 and Un can have substantially the same power level.

In summary, the present invention provides an optical network unit that can be used in a passive optical network, and the optical network unit is capable of adjusting the power level of the upstream optical signal. Based on the distance between each optical network unit and the optical line termination, the power level of the upstream optical signals can be magnetically adjusted for compensating variations in signal or power losses due to different transmission distances.

In describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

It will be appreciated by those skilled in the art that changes could be made to the examples described above without departing from the broad inventive concept thereof It is understood, therefore, that this invention is not limited to the particular examples disclosed, but it is intended to cover modifications within the spirit and scope of the present invention as defined by the appended claims.

We claim:

1. An optical network device comprising:
   a control unit configured to generate a magnetic signal based on a control signal, the control signal being configured to provide information relating to a distance between the optical network device and an optical line termination;
   a light source configured to generate an input optical signal:
   a variable optical attenuator comprising:
      a first polarizer configured to generate a first polarized optical signal by transmitting a part of the input optical signal having a first polarization plane;
      a tunable polarization rotator configured to generate a second polarized optical signal by adjusting a polarization angle of the first polarized optical signal based on the magnetic signal; and
      a second polarizer configured to generate an output optical signal by transmitting a part of the second polarized optical signal having a second polarization plane; and
   an additional variable optical attenuator between the light source and the variable optical attenuator, the additional variable optical attenuator including an optical isolator configured to reduce reflected light from the variable optical attenuator, the reflected light being associated with the input optical signal.

2. The optical network unit of claim 1, further comprising:
   a driving circuit configured to generate a driving signal to drive the light source.

3. The optical network device of claim 1, further comprising:
   a receiver configured to receive from the optical line termination a downstream optical signal which contains the information regarding the distance between the optical network unit and the optical line termination, and configured to generate the control signal based on the information.

4. The optical network device of claim 1, wherein the tunable polarization rotator includes a Faraday rotator.

5. The optical network device of claim 1, wherein:
   the first polarizer is configured to generate the first polarized optical signal by transmitting a part of the input optical signal having a 0°-polarization plane; and
   the second polarizer is configured to generate the second polarized optical signal by transmitting a part of the second polarized light having a 45°-polarization plane.

6. The optical network device of claim 1, wherein each of the first polarizer and the second polarizer includes a linear polarizer or a polarizing beam splitter.

7. The optical network device of claim 1, wherein the control unit includes an electromagnet or at least one permanent magnet.

8. A passive optical network, comprising:
an optical line termination configured to generate a plurality of downstream optical signals; and
a plurality of optical network units each being configured to generate an upstream optical signal having a magnitude magnetically adjusted based on a distance between the each optical network unit and the optical line termination, each of the plurality of optical network units comprising:
a control unit configured to generate a magnetic signal based on a control signal, the control signal providing information relating to a distance between the optical network unit and the optical line termination;
a light source configured to generate an input optical signal;
a variable optical attenuator comprising:
a first polarizer configured to generate a first polarized optical signal by transmitting a part of the input optical signal having a first polarization plane;
a tunable polarization rotator configured to generate a second polarized optical signal by adjusting a polarization angle of the first polarized optical signal based on the magnetic signal; and
a second polarizer configured to generate the upstream optical signal by transmitting a part of the second polarized optical signal having a second polarization plane; and
an additional variable optical attenuator between the light source and the variable optical attenuator, the additional variable optical attenuator including an optical isolator configured to reduce reflected light from the variable optical attenuator, the reflected light being associated with the input optical signal.

9. The passive optical network of claim 8, wherein each of the plurality of optical network units further comprises:
a driving circuit configured to generate a driving signal to drive the light source.

10. The passive optical network of claim 8, wherein each of the plurality of optical network units further comprises:
a receiver configured to receive a downstream optical signal containing information related to the distance between the optical network unit and the optical line termination, and generating the control signal based on the information.

11. The passive optical network of claim 8, wherein:
the first polarizer is configured to generate the first polarized optical signal by transmitting a part of the input optical signal having a 0°-polarization plane; and
the second polarizer is configured to generate a second polarized optical signal by transmitting a part of the second polarized light having a 45°-polarization plane.

12. The passive optical network of claim 8, wherein each of the first polarizer and the second polarizer includes a linear polarizer or a polarizing beam splitter.

13. The optical network device of claim 8, wherein the control unit includes an electromagnet or at least one permanent magnet.

14. An optical network device in a passive optical network, comprising:
a receiver configured to receive an optical signal from an optical line termination in the passive optical network, the optical signal including information regarding the distance between the optical network unit and the optical line termination;
a control unit configured to generate a magnetic signal based on the information;
a light source configured to generate an input optical signal;
a first polarizer configured to generate a first polarized optical signal by transmitting a part of the input optical signal having a first polarization plane;
a polarization rotator being rotatable based on the magnetic signal to provide a polarization angle for the first polarized optical signal, the polarization rotator thereby being configured to generate a second polarized optical signal;
a second polarizer configured to generate an output optical signal by transmitting a part of the second polarized optical signal having a second polarization plane; and
an additional variable optical attenuator between the light source and the variable optical attenuator, the additional variable optical attenuator including an optical isolator configured to reduce reflected light from the variable optical attenuator, the reflected light being associated with the input optical signal.

* * * * *

UNITED STATES PATENT AND TRADEMARK OFFICE
CERTIFICATE OF CORRECTION

| | | |
|---|---|---|
| PATENT NO. | : 8,107,819 B2 | Page 1 of 1 |
| APPLICATION NO. | : 11/756514 | |
| DATED | : January 31, 2012 | |
| INVENTOR(S) | : Yang et al. | |

It is certified that error appears in the above-identified patent and that said Letters Patent is hereby corrected as shown below:

<u>Column 1,</u>
Line 32, "remises" should read --premises--.

Signed and Sealed this
Third Day of July, 2012

David J. Kappos
*Director of the United States Patent and Trademark Office*